METALLIZED DISAZO DYES

Albert Webb Bauer and Ernest Csendes, Wilmington, Del., assignors to E. I. du Pont de Nemours and Company, Wilmington, Del., a corporation of Delaware No Drawing. Application June 29, 1956
Serial No. 594,705

7 Claims. (Cl. 260—148)

This invention relates to novel metallized disazo dyes, suitable as direct dyes for cotton. It is an object of this invention to provide novel dyestuffs of the above type, which are useful as direct dyes for cellulosic fiber such as cotton and viscose rayon, and which produce on these fibers greenish blue to bluish grey shades of outstanding light fastness and wash fastness. Another object is to produce dyestuffs of the aforegoing character which will not lose their light fastness even if the dyed fiber is aftertreated with resinous agents as for the purpose of crease proofing or calendering. A further object is to produce dyestuffs of the aforegoing character which may be applied to mixtures of cotton and nylon without staining the latter. A still further object is to provide a process for producing the aforegoing dyestuffs in a state of high purity. Various additional objects and advantages of this invention will become apparent as the description proceeds.

It is known that direct dyestuffs for cotton may be obtained by coppering disazo dyes of the general formula

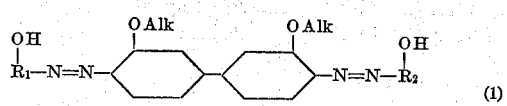

wherein $R_1$—OH and $R_2$—OH represent the radicals of various naphthol and amino-naphthol sulfonic acids, while Alk is a lower alkyl radical (usually 1 to 2 C-atoms). The coppering is generally achieved by treating an alkaline aqueous solution of the disazo dye with an ammoniacal solution of a copper salt, for instance cuprammonium sulfate, in the presence of an excess of ammonia or of a water-soluble organic amine. In the process, the alkyl groups on the O—Alk radicals as well as the H atoms of the OH radicals become eliminated and replaced by copper atoms, which are generally coordinated by auxiliary valencies to the N-atoms of the azo bridges. Moreover, one or more molecules of ammonia or of the organic amine employed generally becomes coordinated with each copper atom. Consequently, the metallized disazo compound has the general formula

wherein $R_1$ and $R_2$ have the same meaning as above, while X represents a molecule of ammonia or of the coordinated amine.

As amines commonly employed hitherto for this purpose may be mentioned methylamine, ethylamine, piperidine, mono-, di- or triethanolamine, morpholine and pyridine.

We have now found that considerable improvement in light fastness of the resulting dye, accompanied often by a diminished tendency to stain nylon fiber, is achieved by selecting, as basic nitrogenous agent in the coppering procedure, an amino-sugar of the general formula $$CH_2OH(CHOH)_x—CH_2NHR$$

wherein $x$ is an integer not less than 3 and not greater than 4, while R is a member of the group consisting of hydrogen, methyl, ethyl and betahydroxyethyl.

As practical illustrations of such amino-sugars may be mentioned glucamine, methyl glucamine, ethyl glucamine, betahydroxyethyl glucamine, methyl xylamine and methyl galactamine. In the discussion which follows, wherever methyl glucamine is named, it is meant to typify the entire group.

Particularly outstanding improvements in the above respects are obtained if at least one of the sulfonated naphthol radicals $R_1$—OH and $R_2$—OH is the radical of an amino-naphthol disulfonic acid, for instance H-acid, N-ethyl H-acid or RR-acid.

For the purpose of making clearer the discussion which follows and the specific examples hereinbelow, the following table of names of coupling components is given:

H acid—8-amino-1-naphthol-3,6-disulfonic acid
Gamma acid—7-amino-1-naphthol-3-sulfonic acid
Chicago acid—8-amino-1-naphthol-5,7-disulfonic acid
Violet acid—1-naphthol-3,6-disulfonic acid
RR acid—7-amino-1-naphthol-3,6-disulfonic acid
Epsilon acid—1-naphthol-3,8-disulfonic acid
R acid—2-naphthol-3,6-disulfonic acid
N-ethyl H acid—8-ethylamino-1-naphthol-3,6-disulfonic acid
K acid—8-amino-1-naphthol-3,5-disulfonic acid
Schaeffer's acid—2-naphthol-6-sulfonic acid
J acid—6-amino-1-naphthol-3-sulfonic acid
L acid—1-naphthol-5-sulfonic acid Accordingly, our invention may be restated as comprising a group of novel metallized disazo dyes of the general Formula 2 above, wherein X is an amino-sugar, $R_1$—O is the radical of an amino-naphthol disulfonic acid while O—$R_2$ is the radical of a naphthol-, aminonaphthol-, or aryl-methyl-pyrazolone mono- or disulfonic acid, for instance, H-acid, N-ethyl H-acid, gamma acid, any other of the acids named in the above table, 1-(m- or p-sulfophenyl)-3-methyl-5-pyrazolone or 1-(6,8-disulfo-1-naphthyl)-3-methyl-5-pyrazolone.

Apart from the above features of coppering in the presence of methyl-glucamine and of selecting at least one of the members $R_1$ and $R_2$, as specified above, the coppering procedure may proceed in ordinary manner. The copper salt selected may be cupric sulfate, cupric nitrate, cupric chloride or cupric acetate. Cupric hydroxide or freshly precipitated cupric oxide may also be employed. In each case, the copper compound is first converted into an aqueous cuprammonium solution in the usual manner.

The treatment of the disazo dye with this solution and methyl-glucamine is preferably effected at reflux temperatures (95° to 105° C.) and in glass, enamel or stainless steel equipment. Temperatures above 100° C., up to 110° C., under pressure, may also be used.

The quantity of methyl-glucamine employed should be not less than one mole per azo group. It may be much greater, however, and in practice we prefer to use about two moles per azo group. We find that the excess of methyl-glucamine has a beneficial effect on the purity of the product. The theory of this action is not entirely clear to us, but it may be that the excess of methylglucamine serves to solubilize impurities formed during the coupling, thereby aiding in their removal during the salting out of the final dye.

Without limiting our invention, the following examples are given to illustrate our preferred mode of operation. Parts mentioned are by weight.

EXAMPLE 1

Part 1.—Preparation of the disazo dye 24.4 parts (0.1 mole) of o-dianisidine are slurried in 200 parts of water and tetrazotized at 0° to 5° C. in the usual manner with a mixture of hydrochloric and sulfuric acid and sodium nitrite solution. The excess of nitrite is removed with sulfamic acid. The light amber-colored tetrazo solution is added slowly to a coupling solution prepared by dissolving 71.7 parts of H acid monosodium salt (0.21 mole) in 220 parts of water containing 24 parts of 10 N NaOH solution, and adjusting the pH to 9.0 with soda ash. The pH of the mixture is now adjusted to 7.5 to 8.0 with 10 N NaOH, and the mass is stirred for approximately 18 hours at 0° to 5° C. After heating to 60° C. for 30 min., the disazo dye is precipitated by adding salt (25 grams of NaCl per 100 cc. of the reaction mixture) and filtered. A disazo dye of the following structure is obtained.

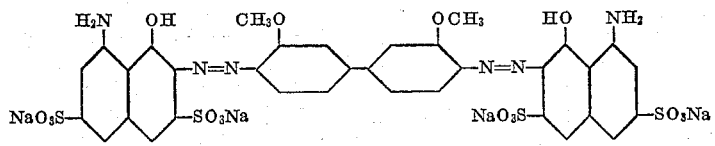

Part 2.—Metallization

The filter cake obtained in Part 1 is slurried in 2000 parts of water at 60° C. and treated with a cuprammonium solution prepared from 181 parts of an aqueous 27% ammonia solution and a solution of 50 parts (0.2 mole) of CuSO$_4$.5H$_2$O in 150 parts of water. 80 parts (0.45 mole) of N-methyl-glucamine are then added, and the reaction mass is heated at refluxing temperature for 20 hours. The coppered dye is isolated by adding sodium chloride (25 grams per 100 cc.) and filtering. The filter cake is pressed out and dried at 75° C. to yield 200 parts of dye. The copper complex obtained has the formula:

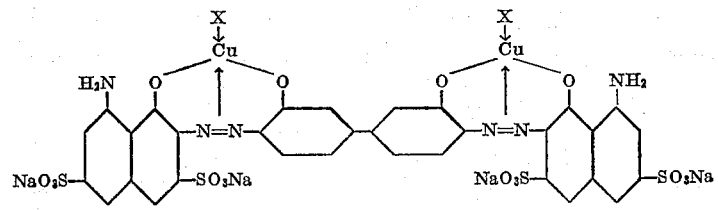

wherein X represents:

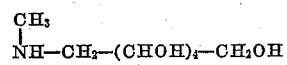

This product is a bright, direct, greenish blue dye for cellulosic fibers and exhibits excellent light fastness, even when the dyed fibers are after-treated with resins commonly employed for crease proofing or calendering. Furthermore, the novel product dyes mixed fibers of nylon and cotton or nylon and viscose rayon without staining the nylon fiber.

When the N-methyl glucamine used in the metallization step is replaced by 74 parts of glucamine or 86 parts of N-ethyl glucamine similar results are obtained. Likewise, equivalent amounts of other polyhydroxy aliphatic amines may be used e. g. N-methyl xylamine, N-betahydroxyethyl glucamine and N-methyl galactamine.

EXAMPLE 2

24.4 parts (0.1 mole) of o-dianisidine are tetrazotized as in Example 1 and the light amber colored tetrazo solution is neutralized with a cold sodium carbonate solution. A solution of H acid sodium salt is prepared by dissolving 35.8 parts (0.105 mole) of the monosodium salt of this acid in 200 parts of water containing 16 parts of a 10 N NaOH solution, and soda ash is added to bring the pH of this solution to 10.0. The alkaline H-acid solution is added slowly to the tetrazo solution at 0° to 5° C. until an excess of H acid and no excess of tetrazo is found by known tests. The blue slurry of the monoazo diazo compound is then added at 0° to 5° C. to a solution of Gamma acid sodium salt, prepared by dissolving 28.7 parts (0.12 mole) of this acid in 240 parts of water containing 16 parts of a 10 N NaOH solution and adjusting the pH to 10.0 with sodium carbonate. The pH of the mixed mass is then adjusted to 8.0 with sodium carbonate solution, and 240 parts of pyridine are added. The coupling mass is stirred for 18 hours at 0° to 5° C., heated to 60° for 30 min., then treated with 550 parts of sodium chloride and filtered. An unsymmetrical, disazo dye of the following structure is obtained.

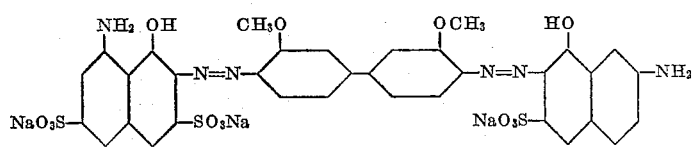

The metallization step is carried out as in Example 1. The coppered dye is isolated by salting, using 900 parts of sodium chloride and filtering. The well-pressed filter cake is dried at 75° C. to yield 200 parts of dye. The copper complex obtained has the formula

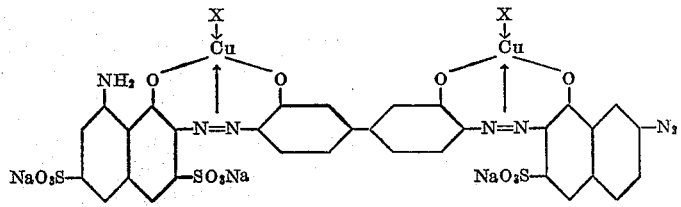

wherein X stands for:

This product is a direct, greenish blue dye for cellulosic fibers and exhibits excellent light fastness, even if the dyed fiber is after-treated with resins. It dyes mixed fibers of nylon and cotton or nylon and viscose rayon without staining of the nylon fiber.

EXAMPLE 3

In Example 2, the H acid solution is replaced by a solution of Violet acid sodium salt, prepared by dissolving 32.5 parts of this acid (0.107 mole) in 200 parts of water, 20 parts of 10 N NaOH solution and adjusting the pH to 10 with sodium carbonate. Instead of the Gamma acid sodium salt solution a solution of H acid sodium salt is used which is prepared by dissolving 38.3 parts of the mono-sodium salt of this acid (0.112 mole) in 180 parts of water and 16 parts of 10 N NaOH solution, followed by the addition of sodium carbonate to obtain pH 10. The tetrazo is first coupled to the Violet acid and then to the H acid. The disazo dye of following structure is obtained:

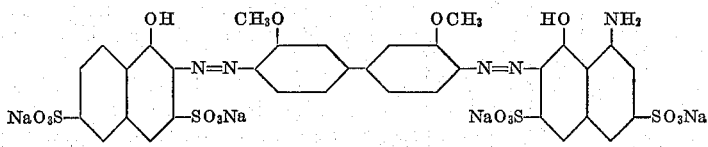

The disazo dye is coppered and isolated as in Example 1. After drying the filter cake in a 75° oven, 60 parts of coppered dye are obtained, the structure of which is believed to be:

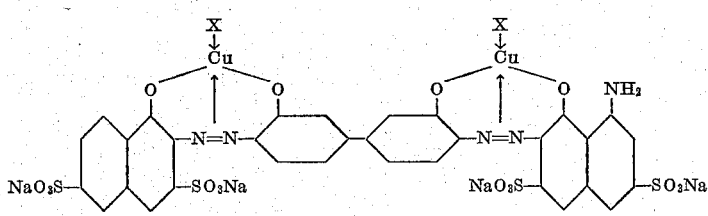

wherein X is:

The coppered dye dyes cellulose fibers in greenish blue shades which possess excellent light fastness even after resin-treatment. Nylon is not stained by the dye when the latter is applied to a mixture of nylon and cellulose fibers.

EXAMPLE 4

(a) 24.4 parts (0.1 mole) of o-dianisidine are tetrazoitized as in Example 1 and the light amber colored tetraazo solution is neutralized with cold sodium carbonate solution. A solution of RR acid sodium salt is prepared by dissolving 32.8 parts (0.103 mole) of this acid in 200 parts of water, 24 parts of a 10 N NaOH solution, and soda ash is added to bring the pH of this solution to 10.0. The alkaline RR acid solution is added slowly to the tetraazo solution at 0–5° C. until an excess of RR acid and no excess tetraazo is found by known tests. The slurry of the monoazo diazo compound is then added at 0–5° C. to a solution of Gamma acid and the coupling carried out as described in Example 2. The disazo dye is isolated by adding 25 parts NaCl for each 100 parts of solution.

The coppering of the disazo dye is carried out as described in Example 2. The coppered dye is isolated by adding 25 parts NaCl for each 100 parts of solution, and the well-pressed filter cake is dried at 75° C.

The product is a direct bluish gray dye for cellulosic fibers and exhibits excellent light fastness even when the dyed fiber is after-treated with resins. It dyes mixed fibers of nylon and cotton or rayon without staining of the nylon.

(b) The Gamma acid in part (a) of this example is replaced by an equivalent amount of RR acid. The coppered dye obtained is a direct bluish gray dye for cellulosic fibers and exhibits similar properties as the product obtained in part (a).

EXAMPLE 5

(a) Tetrazotized o-dianisidine is coupled to H acid as described in Example 2, and the blue slurry of the monoazo diazo compound is then added at 0–5° C. to a solution of 1-naphthol-5-sulfonic acid, prepared by dissolving 26.8 parts (0.12 mole) of this acid in 200 parts of water and 16 parts of 10 N NaOH. The pH of the solution is then adjusted to 10.0 with sodium carbonate. The coupling mass is stirred for 18 hrs. at 0–5° C., heated to 60° C. for 30 min., then 20 parts NaCl are added per 100 parts of solution to precipitate the dye which is filtered off.

The metallization step is carried out as described in Example 2. The well-pressed filter cake is dried at 75° C. giving an excellent yield of dye. The copper complex obtained is a direct greenish blue dye for cellulosic fibers and exhibits excellent light fastness even after the dyed fiber is treated with resins. It dyes mixed fibers of nylon and cotton or rayon without staining of the nylon fiber.

(b) The 1-naphthol-5-sulfonic acid in part (a) of this example is replaced by an equivalent amount of R-salt or Epsilon acid. The coppered dyes obtained are direct blue dyes for cellulosic fibers and exhibit similar properties as the product described in part (a) of this example.

(c) The 1-naphthol-5-sulfonic acid in part (a) of this example is replaced by an equivalent amount of the sodium salt of Schaeffer's acid. The coppered dye obtained from this unsymmetrical disazo compound is a blue direct dye which shows excellent light fastness on cellulosic fibers even after resin treatments.

EXAMPLE 6

(a) The procedure is as in Example 5(a), except that the 1-naphthol-5-sulfonic acid is replaced by an equivalent amount of 1-(m- or p-sulfophenyl)-3-methyl-5- pyrazolone. The coppered dye obtained from this unsymmetrical disazo dye has the following structure:

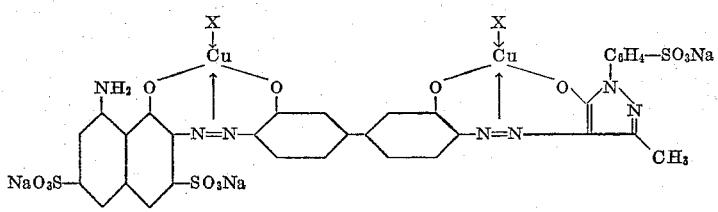

wherein X designates:

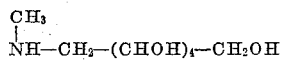

The above copper complex is a bluish gray direct dye which shows excellent light fastness in cellulosic fibers even after resin treatments. Nylon is not stained in mixture with cotton and viscose rayon by this dye.

(b) The procedure is the same as in Example 5(a), except that the 1-naphthol-5-sulfonic acid is replaced by an equivalent amount of 1-(6,8-disulfo-1-naphthyl)-3-methyl-5-pyrazolone. The coppering is then carried out as in Example 2. A product having similar properties to that obtained in part (a) of this example is obtained.

EXAMPLE 7

*Part (a).—Preparation of N-ethyl H-acid*

97 parts of H-acid monosodium salt are slurried in 600 parts of water and dissolved by addition of 20.7 parts of 10 N sodium hydroxide. After adding 47.7 parts of sodium acetate trihydrate the solution is heated to 85° C. and 51 parts of diethyl sulfate are added. After agitation at 85° C. for 30 minutes the solution of ethyl H-acid is cooled and adjusted first to pH 8 (by adding 8 parts of sodium hydroxide and 9 parts of 28% aqueous ammonia) and then to pH 10 (by the aid of soda ash).

*Part (b).—Preparation of the color*

24.4 parts of o-dianisidine are tetrazotized following the method of Example 1. The light amber colored tetrazo solution is neutralized with a cold sodium carbonate solution and then added to the solution of N-ethyl H-acid prepared above.

The coupling solution thus obtained is stirred 45 minutes at 3° C., 5.6 parts of 10 N sodium hydroxide are added and the solution is stirred overnight at 3° C. The solution is then heated to 85° C., the dye is precipitated by the addition of sodium chloride (8% by volume) and is filtered.

The wet filter cake is dissolved in 1250 parts water at 60° C. and treated with a cuprammonium solution prepared from 56 parts of $CuSO_4 \cdot 5H_2O$, 205 parts of 28% aqueous ammonia and 200 parts water. After adding 80 parts of methyl glucamine the whole is refluxed for 24 hours, cooled to 65° C., and 385 parts of salt are added. After filtration the wet cake is washed with 25% salt solution until the filtrate becomes colorless. The filter cake is then dried. One obtains an excellent yield of the following dye:

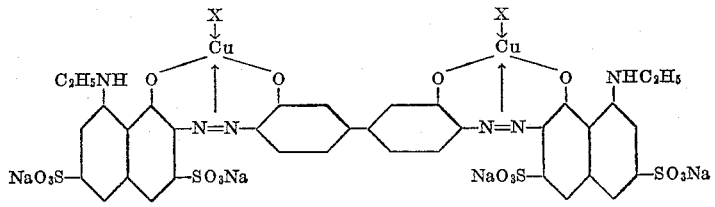

wherein X is:

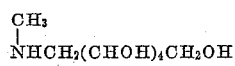

This product dyes cellulosic fibers a greenish blue shade which is greener than that obtained by the dye of Example 1, and in other properties compares favorably with the latter.

EXAMPLE 8

A tetrazotized o-dianisidine solution was prepared as in Example 1 and neutralized with cold sodium carbonate solution then coupled to a solution of K acid (8-amino-1-naphthol-3,5-disulfonic acid) prepared by dissolving 76.6 parts (0.24 mole) of this acid in 440 parts of water containing 40 parts of 10 N sodium hydroxide solution and adjusting the pH to 10.0 with sodium carbonate. The coupling procedure itself and the isolation of the disazo dye followed the teachings given in Example 1. The disazo dye was coppered as in Example 1, and the well-pressed filter cake of the copper complex was dried at 75° C. An excellent yield of the metal complex was obtained.

The latter is a greenish blue direct dye showing excellent light fastness on cellulosic fibers even after resin treatments. This dye does not stain nylon in mixture with cotton or viscose rayon.

The advantages of this invention will now be readily apparent. In addition to the improved light-fastness and other good qualities mentioned above, most of the dyes obtained according to this invention possess greater brightness than the corresponding dyes coppered in the presence of, say, triethanolamine. This quality is of particular practical interest in connection with those dyes which are of greenish blue shade.

The compounds of this invention are also obtained in an exceptionally high state of purity, as can be readily demonstrated by chromatographic tests.

Finally, when the novel colors of this invention finally fade under prolonged exposure to light, they fade "on-tone"; that is, there is no shift in shade between the faded portion and the unexposed portion. This is a significant advantage over, for example, the triethanolamine counterparts of these colors, which fade considerably "off shade."

We claim as our invention:

1. A metallized disazo dye of the formula

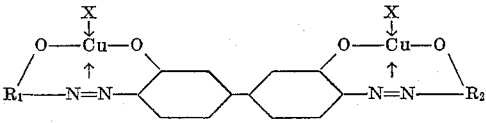

wherein X is a molecule of an amino-sugar coordinated with the Cu-atoms, $R_1$—O is the radical of an amino-1-naphthol disulfonic acid to which the azo bridge is attached in the 2-position, O—$R_2$ is the radical of a sulfonated coupling component of the group consisting of naphthol mono- and disulfonic acids, amino-naphthol mono- and disulfonic acids and mono- and disulfonated aryl-methyl-pyrazolones, and the azo bridge is attached to the radical $R_2$ in position ortho to the O-atom, said amino-sugar being a compound of the formula $$CH_2OH(CHOH)_x—CH_2NHR$$

wherein $x$ is an integer not less than 3 and not greater than 4, while R is a member of the group consisting of hydrogen, methyl, ethyl and betahydroxyethyl.

2. A metallized disazo dye as in claim 1, wherein $R_1$—O is the radical of H-acid.

3. A metallized disazo dye as in claim 1, wherein $R_1$—O is the radical of N-ethyl H-acid.

4. A metallized disazo dye as in claim 1, wherein $R_1$—O and O—$R_2$ are both radicals of H-acid.

5. A metallized disazo dye as in claim 1, wherein $R_1$—O is the radical of RR-acid.

6. A process of producing a metallized disazo dye of good brightness and light-fastness, which comprises treating jointly with an aqueous cuprammonium solution and an amino-sugar a disazo dye of the formula

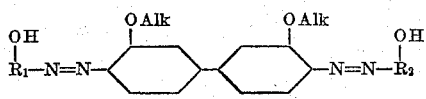

wherein Alk is an alkyl radical of 1 to 2 C-atoms, $R_1$—OH is the radical of an amino-1-naphthol disulfonic acid to which the azo bridge is attached in 2-position, while $R_2$—OH is the radical of a sulfonated coupling component selected from the group consisting of naphthol mono- and disulfonic acids, amino-naphthol mono- and disulfonic acids, and mono- and disulfonated aryl-methyl-pyrazolones, the azo bridge being attached to the radical $R_2$ in position ortho to the O-atom, and the treatment being carried out at a temperature between 95° and 110° C., until the alkyl radicals have been eliminated and replaced by Cu atoms, said amino-sugar being a compound of the formula $CH_2OH(CHOH)_x$—$CH_2NHR$, wherein $x$ is an integer not less than 3 and not greater than 4, while R is a member of the group consisting of hydrogen, methyl, ethyl and betahydroxyethyl.

7. A process as in claim 6, the quantity of the amino sugar employed being about 4 moles per mole of the disazo compound.

References Cited in the file of this patent
UNITED STATES PATENTS

| | | |
|---|---|---|
| 1,989,569 | Straub et al. | Jan. 29, 1935 |
| 2,064,332 | Zwilgmeyer | Dec. 15, 1936 |
| 2,203,196 | Hanhart | June 4, 1940 |
| 2,536,957 | Riat et al. | Jan. 2, 1951 |